US008001679B2

(12) United States Patent
Youtsey

(10) Patent No.: US 8,001,679 B2

(45) Date of Patent: Aug. 23, 2011

(54) COMPRESSION TOOL WITH ADJUSTABLE PUSHING LENGTH

(75) Inventor: Timothy L. Youtsey, Scottsdale, AZ (US)

(73) Assignee: PCT International, Inc., Mesa, AZ (US)

( * ) Notice: Subject to any disclaimer, the term of this patent is extended or adjusted under 35 U.S.C. 154(b) by 417 days.

(21) Appl. No.: 12/320,138

(22) Filed: Jan. 21, 2009

(65) Prior Publication Data

US 2010/0180436 A1 Jul. 22, 2010

(51) Int. Cl.
*B23P 19/00* (2006.01)

(52) U.S. Cl. ................. 29/758; 29/748; 29/751; 29/760

(58) Field of Classification Search .................... 29/758, 29/748–752, 760, 764, 861; 72/405.01, 405.06, 72/409.14

See application file for complete search history.

(56) References Cited

U.S. PATENT DOCUMENTS 7,120,997 B2 * 10/2006 Islam et al. ..................... 29/751
7,594,315 B2 * 9/2009 Montena .......................... 29/751
7,703,196 B2 * 4/2010 Chawgo .......................... 29/751

* cited by examiner

*Primary Examiner* — Thiem Phan

(74) *Attorney, Agent, or Firm* — Perkins Coie LLP

(57) ABSTRACT

A compression tool for connecting end connectors to coaxial cable ends includes a die for supporting a cable thereon, a slider axially spaced from the die for compressing against an end connector, which is fitted around but not yet crimped onto the cable end, and a handle connected to the slider via an inner link. A push button on the handle can be selectively inserted in a front or a rear locating hole provided on the inner link. When the handle is pivotally turned downward, the push button forces the inner link forward while the inner link is pivotally turned about the push button, so that the slider connected to the inner link is pushed forward toward the die. By inserting the push button in the front or the rear locating hole, the slider can be pushed forward by a shorter or a longer length, respectively.

6 Claims, 7 Drawing Sheets

COMPRESSION TOOL WITH ADJUSTABLE PUSHING LENGTH

FIELD OF THE INVENTION

The present invention relates to a compression tool, and more particularly to a compression tool with adjustable pushing length for connecting end connectors of different lengths to cables.

BACKGROUND OF THE INVENTION

Coaxial cable connectors are well-known among people. An F connector for coaxial cable is typically screwed to a secondary interface connector for the coaxial cable to electrically connect to various electronic devices, such as televisions, citizen band (CB) and frequency modulation (FM) radios, and amateur radio systems.

Conventionally, a coaxial cable includes a central core, a dielectric insulator surrounding the central core, at least one layer of braided metallic shield surrounding the dielectric insulator, and a plastic jacket covering the braided metallic shield. The conventional coaxial cable also includes an end connector main body and a nut. The nut is compressed to couple with an outer sleeve of the end connector main body, so that the outer sleeve is inward compressed and deformed to thereby tightly connect to the coaxial cable. However, this manner of connecting the end connector to the coaxial cable requires extra cost and various tools, and, when working outdoors, the workers have to inconveniently carry the various tools.

Therefore, it is tried by the inventor to develop an improved compression tool for connecting end connectors to coaxial cables.

SUMMARY OF THE INVENTION

A primary object of the present invention is to provide a compression tool with adjustable pushing length for connecting end connectors of different lengths to cable ends.

Another object of the present invention is to provide a compression tool that utilizes front and rear locating holes and a push button having first and second locating pin portions to control a length by which a slider is pushed forward to compress an end connector against a cable end.

To achieve the above and other objects, the compression tool with adjustable pushing length for connecting end connectors of different lengths to coaxial cable ends according to the present invention includes a die for supporting a coaxial cable thereon, a slider axially spaced from the die for compressing against an end connector, which is fitted around but not yet crimped onto the cable end, a handle connected to the slider via an inner link, and a push button provided on the handle for selectively inserting in a front or a rear locating hole provided near a second end of the inner link, so that the inner link is pivotally turnable about the push button. The inner link is pivotally connected at a first end to the slider. The front and the rear locating hole have different diameters, and the push button includes coaxial first and second locating pin portions for inserting in the front and the rear locating hole, respectively. When the handle is pivotally turned downward, the inner link is pivotally turned about the push button while being axially pushed forward by the push button to thereby axially move the slider forward toward the die. When the first locating pin portion of the push button is inserted in the front locating hole, the slider is pushed forward by a shorter length, and when the second locating pin portion of the push button is inserted in the rear locating hole, the slider is pushed forward by a longer length. Therefore, by inserting the push button in different locating holes, the slider can be pushed forward by different lengths.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
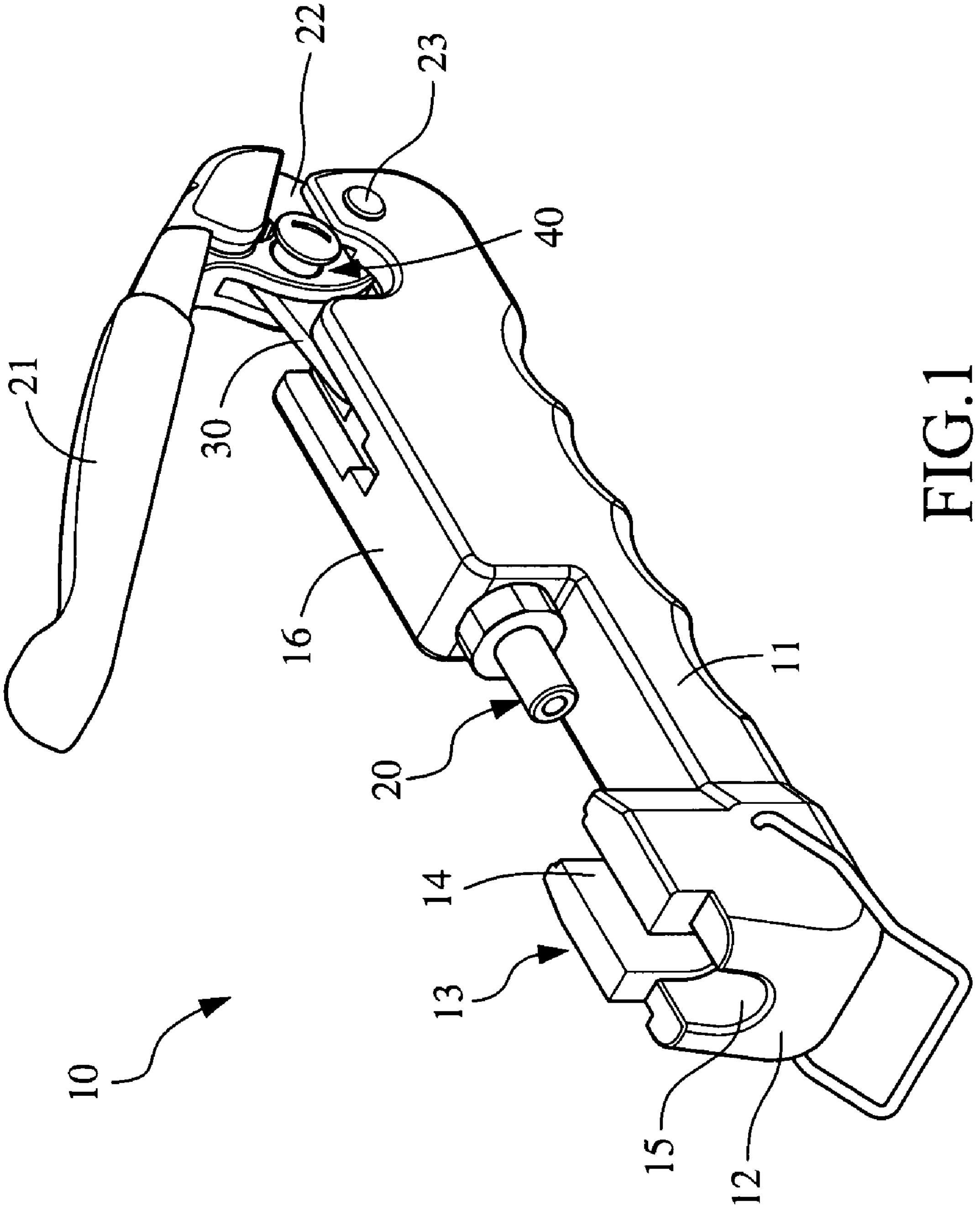
FIG. 1 is a perspective view of a compression tool with adjustable pushing length according to a preferred embodiment of the present invention, showing a first locating pin portion is inserted in a front locating hole on an inner link.
Figure 3:
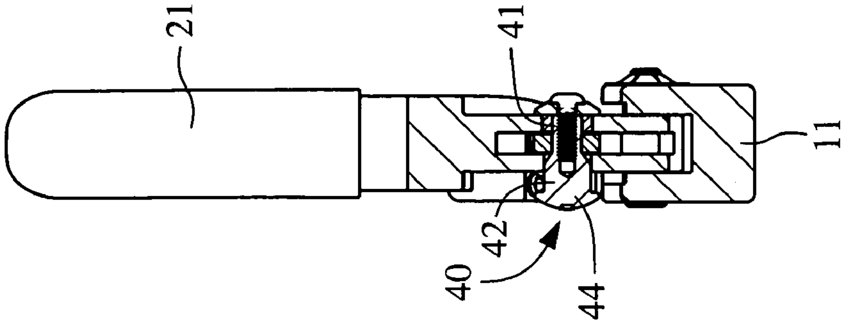
FIG. 3 is a cross sectional view taken along line 3-3 of FIG. 2.

Please refer to FIGS. 1 to 4, in which a compression tool with adjustable pushing length according to a preferred embodiment of the present invention is shown. The compression tool with adjustable push length, which is generally denoted by reference numeral 10 and is also briefly referred to as "the compression tool" herein, is designed for connecting an end connector to a coaxial cable. The compression tool 10 includes a tool body 11. On the tool body 11, there is included a die support 12, on which a die 13 is arranged for receiving a connector of any type therein, such as an F connector, a BNC connector, an RCA connector, etc. In the illustrated preferred embodiment, the die 13 is used to receive an F connector therein. The die 13 internally defines a recess 14, which is communicable with an opening 15 provided at an upper front end of the tool body 11. More specifically, the die 13 and the die support 12 can be integrally formed as one unit, or, alternatively, the die 13 can be removably assembled to the die support 12.

Figure 2:
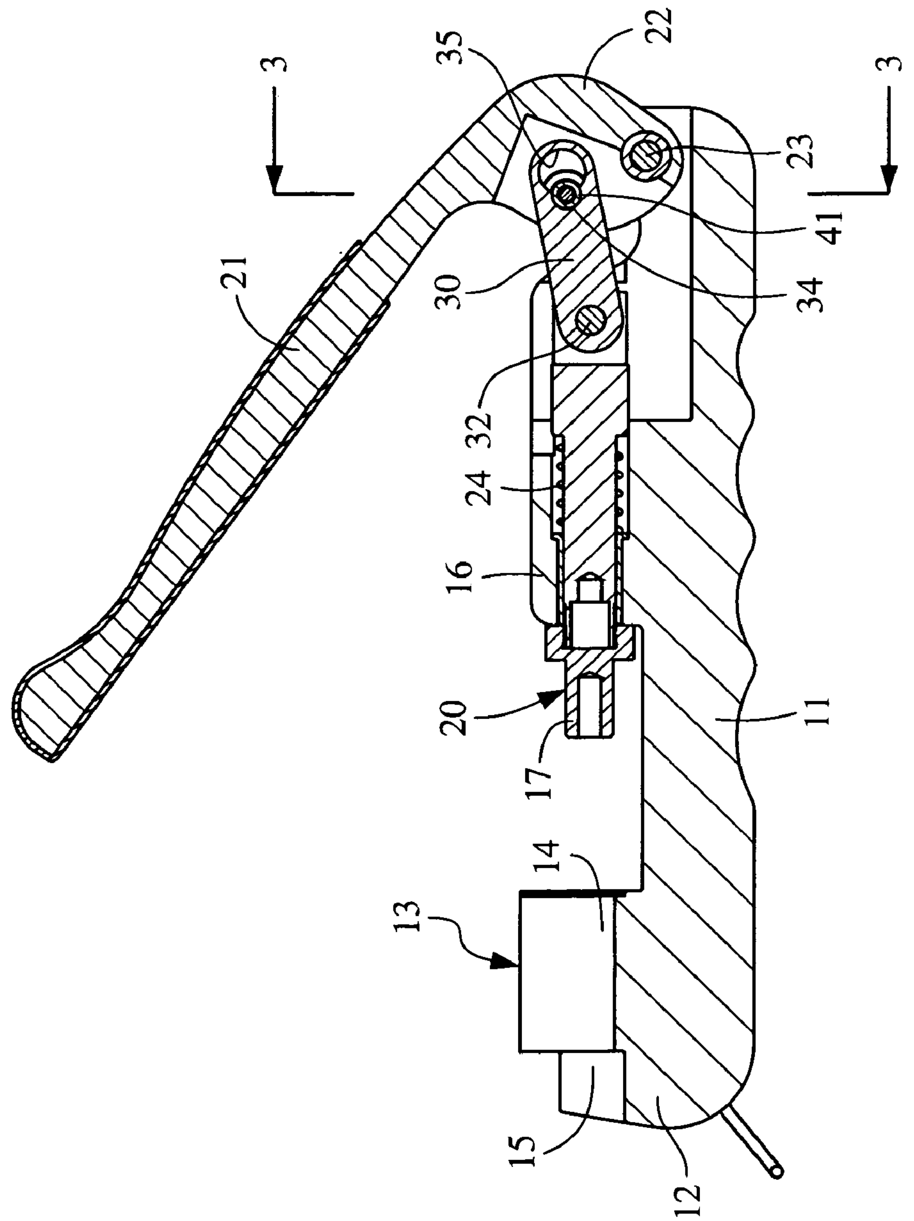
FIG. 2 is a longitudinal sectional view of FIG. 1.
Figure 4:
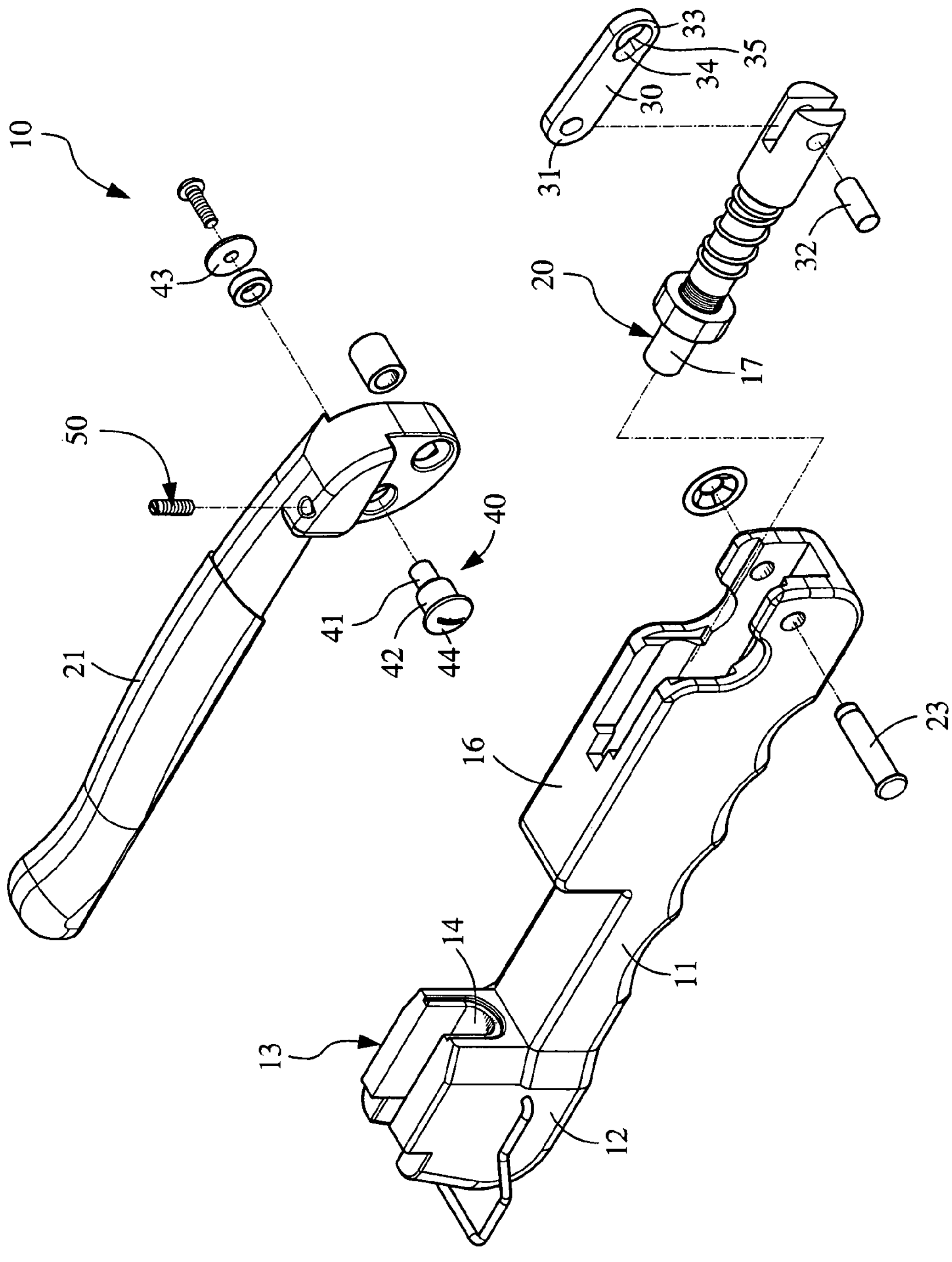
FIG. 4 is a partially exploded perspective view of the compression tool of FIG. 1.
Figure 5:
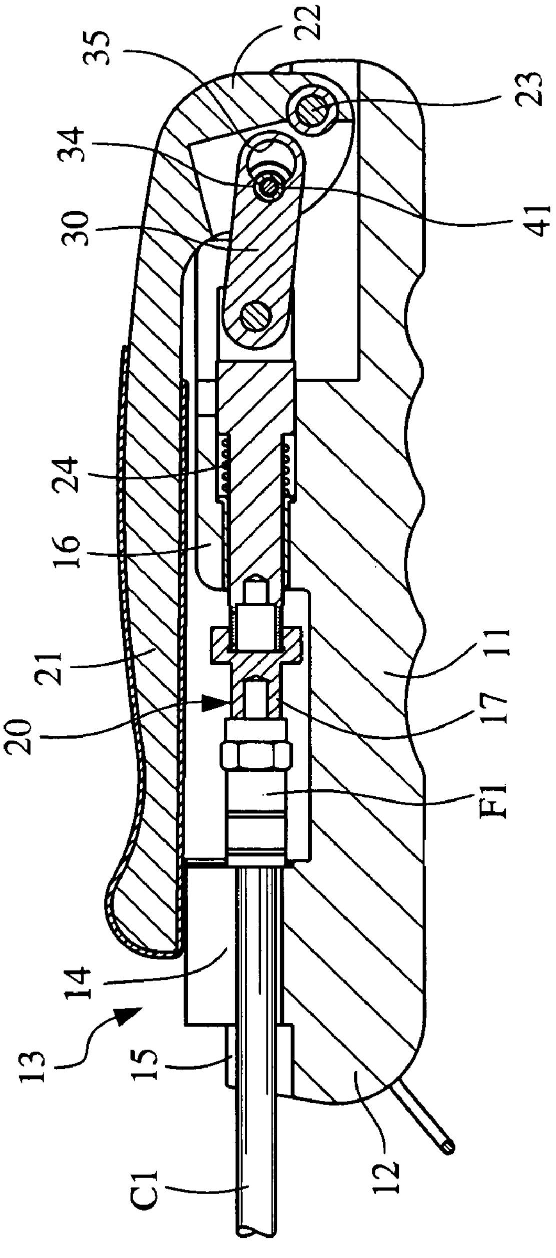
FIG. 5 is a longitudinal sectional view showing a slider of the compression tool shown in FIG. 2 is moved forward to compress and thereby connect an end connector to an end of a cable.

A slider 20 is slidably mounted in a chamber 16, which is provided on and closer to a rear end of the tool body 11 to be axially spaced from the die support 12. The slider 20 is aligned with an axial line of the recess 14 and axially spaced from the recess 14. A pivotally turnable handle 21 is connected at a proximal end to an upper rear end of the tool body 11 with a distal end normally extended forward and upward to contain an acute angle between the handle 21 and the tool body 11. The proximal end of the handle 21 forms a forked arm 22, at where the handle is fixed to the upper rear end of the tool body 11. More specifically, the forked arm 22 is pivotally connected near a rear edge to the chamber 16 via a pivot shaft 23. Particularly, an inner link 30 is arranged in front of the handle 21 to turnably connect to the slider 20, so as to push and pull the slider 20 to axially slide forward and backward, as can be seen in FIGS. 2 and 5 as well as in FIGS. 8 and 9. The die support 12 and the chamber 16 are integral portions on the tool body 11. And, a tension spring 24 is mounted in the chamber 16 around the slider 20 to normally push the slider 20 rearward away from the die 13.

The inner link 30 has a first end 31 connected to a rear end of the slider 20 via a pivot pin 32, and a second end 33 extended into between the forked arm 22 of the handle 21. The inner link 30 is provided near the second end 33 with a front locating hole 34 and a rear locating hole 35, which have different diameters and are communicable with each other. The front locating hole 34 is diametrically smaller than the rear locating hole 35. The inner link 30 is turnably connected to the forked arm 22 of the handle 21 via a push button 40, which is installed on the forked arm 22 to selectively extend through the front locating hole 34 or the rear locating hole 35, so that the inner link 30 is pivotally turnable about the push button 40. When the push button 40 is extended through the front locating hole 34 to connect the inner link 30 to the forked arm 22, the compression tool 10 can provide a shorter pushing length, as can be seen from FIG. 5. And, when the push button 40 is extended through the rear locating hole 35 to connect the inner link 30 to the forked arm 22, the compression tool 10 can provide a longer pushing length, as can be seen from FIG. 9. That is, the provision of the front and the rear locating hole 34, 35 enables the slider 20 connected to the inner link 30 to slide forward by different lengths.

An operator can switch the push button 40 between the front locating hole 34 and the rear locating hole 35, so that the slider 20 is moved forward by different lengths. As can be clearly seen in FIGS. 3 and 4, the push button 40 includes a first locating pin portion 41 and a second locating pin portion 42 that are coaxial. The first locating pin portion 41 is extended from the second locating pin portion 42, and has an outer diameter different from that of the second locating pin portion 42. An operator can selectively extend the first or the second locating pin portion 41, 42 of the push button 40 through the front locating hole 34 or the rear locating hole 35 according to actual need. For example, the first locating pin portion 41 can have an outer diameter one half as large as the outer diameter of the second locating pin portion 42. Therefore, the first locating pin portion 41 having a smaller outer diameter can be extended through and located in the front locating hole 34, while the second locating pin portion 42 having a larger outer diameter can only be extended through and located in the rear locating hole 35.

The push button 40 further includes two end members 43, 44, which are located at an outer end of the first locating pin portion 41 and the second locating pin portion 42, respectively, to restrict a depth to which the push button 40 can be pushed, so that the first and the second locating pin portion 41, 42 can always be held at a predetermined position in the front and the rear locating hole 34, 35, respectively. By inserting the first or the second locating pin portion 41, 42 in the front or the rear locating hole 34, 35, two different pushing lengths are available for the slider 20. Therefore, the inner link 30 with front and rear locating holes 34, 35 and the push button 40 with two diametrically different locating pin portions 41, 42 together enable two standard pushing lengths for the slider 20 to adequately compress and thereby connect end connectors of two different lengths to cable ends.

Figure 6:
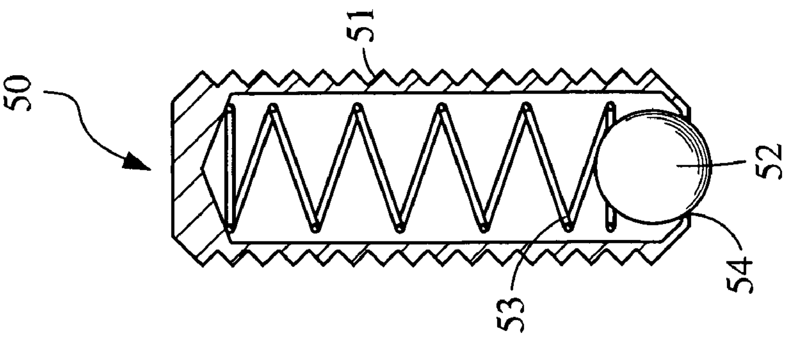
FIG. 6 is a longitudinal sectional view of a stop mechanism for the compression tool of the present invention.
Figure 7:
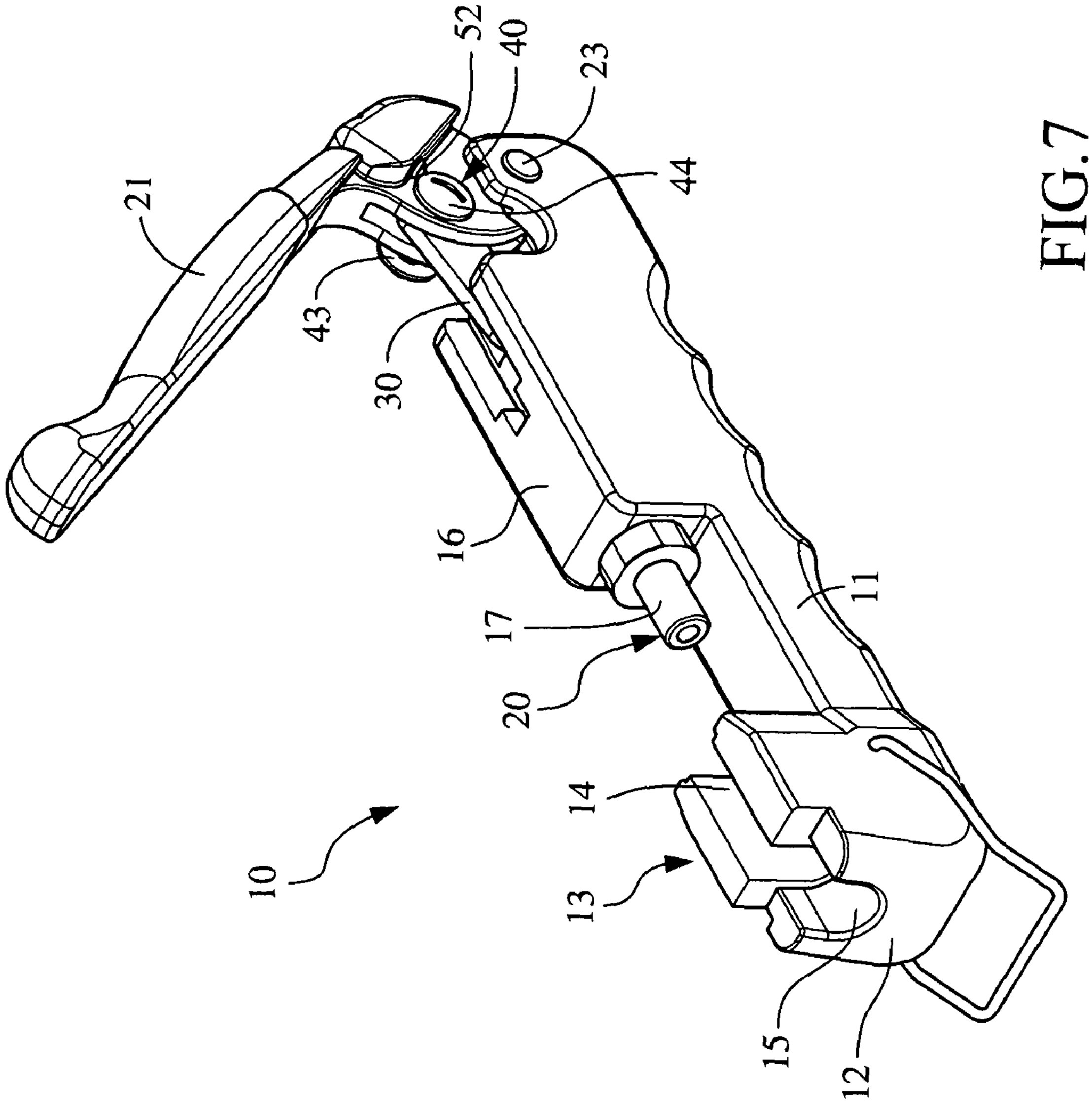
FIG. 7 is another perspective view of the compression tool with adjustable pushing length according to the preferred embodiment of the present invention, showing a second locating pin portion is inserted in a rear locating hole on the inner link.

A stop mechanism 50 is provided to one side of the forked arm 22 of the handle 21. Please refer to FIGS. 4 and 6. The stop mechanism 50 includes an externally threaded sleeve 51 for screwing into an internally threaded hole (not shown) provided on the handle 21, a ball 52 disposed in the sleeve 51, a spring 53 disposed in the sleeve 51 for normally pushing the ball 52 toward a bottom opening 54 of the sleeve 51, so that the ball 52 can elastically protrude from or retract into the bottom opening 54. As shown in FIG. 7, when the end member 44 of the push button 40 has been pushed inward, the ball 52 is elastically pressed against the end member 44, so that the second locating pin portion 42 is held in the rear locating hole 35.

FIGS. 2 and 5 show the relative position and the relation of the first locating pin portion 41 to the front locating hole 34 when the handle 21 is pivotally turned away from and toward the tool body 11, respectively. To use the compression tool 10 to compress and thereby connect a relatively longer end connector F1 to an end of a cable C1, first fit the end connector F1 around the end of the cable C1. Then, the end connector F1 located behind the recess 14 of the die 13 is rearward extended until the end connector F1 is pressed against a center pin 17 at a front end of the slider 20. For example, when the end connector F1 is 31 mm in length, which is relatively longer, the operator has to select the first locating pin portion 41 and extends the same through the front locating hole 34 for pushing the slider 20 forward by a predetermined shorter length. At this position, the push button 40 is in a non-pushed state. When the handle 21 is downward pivotally turned about the pivot shaft 23 from an extended position as shown in FIG. 2 to a closed position as shown in FIG. 5, the push button 40 is forward moved relative to the pivot shaft 23 and the first locating pin portion 41 forces the inner link 30 forward while the inner link 30 is pivotally turned at the front locating hole 34 about the first locating pin portion 41. Accordingly, the slider 20 connected to the first end of the inner link 30 is pushed forward toward the die 13 until the end connector F1 is radially compressed and deformed to tightly crimp onto the end of the cable C1. At this point, the tension spring 24 is in a compressed state. Then, the handle 21 is pivotally turned upward by a large angle, and a restoring force of the tension spring 24 automatically pushes the slider 20 rearward, so that the slider 20 retracts to a home position as that shown in FIG. 2.

Figure 8:
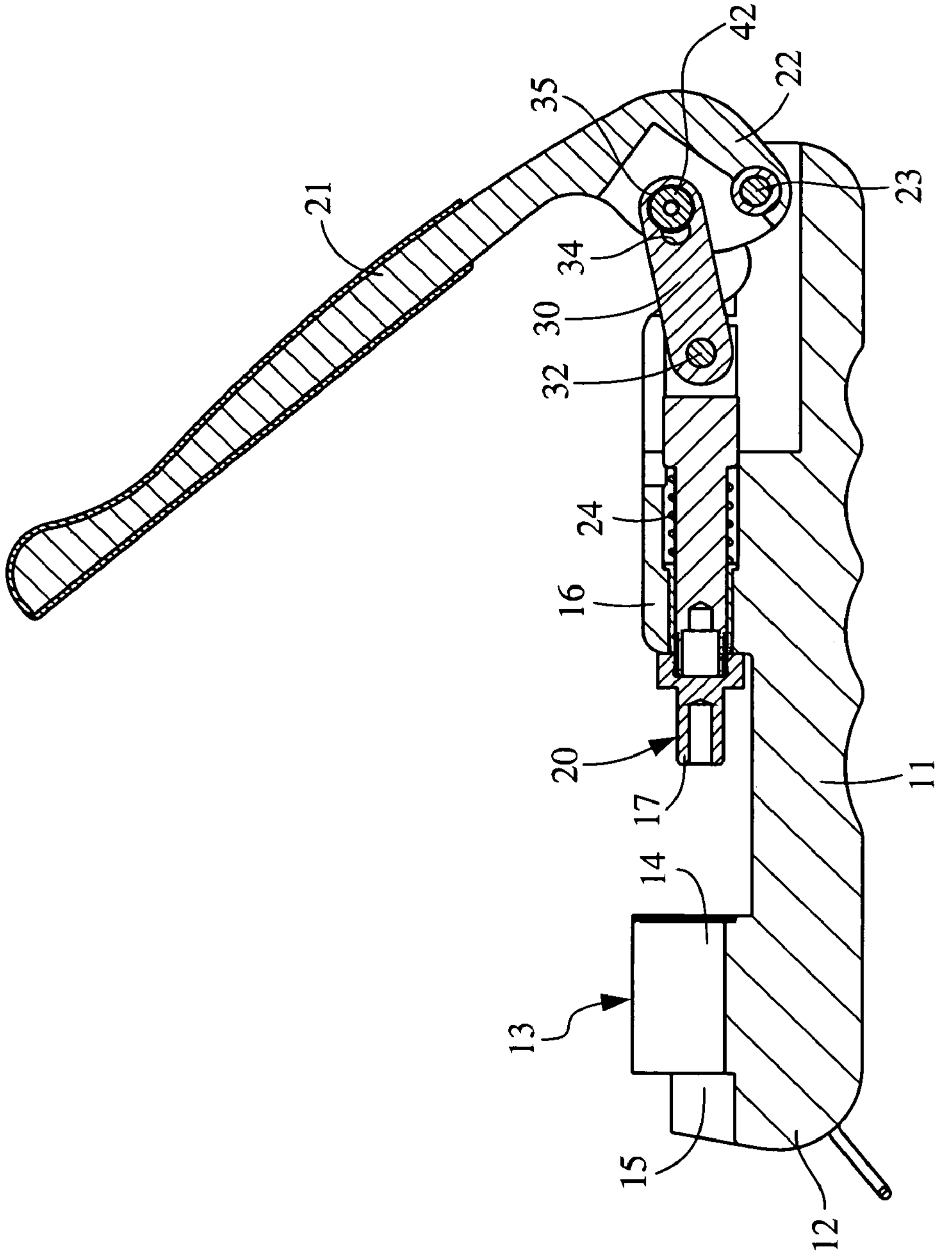
FIG. 8 is a longitudinal sectional view of FIG. 7.
Figure 9:
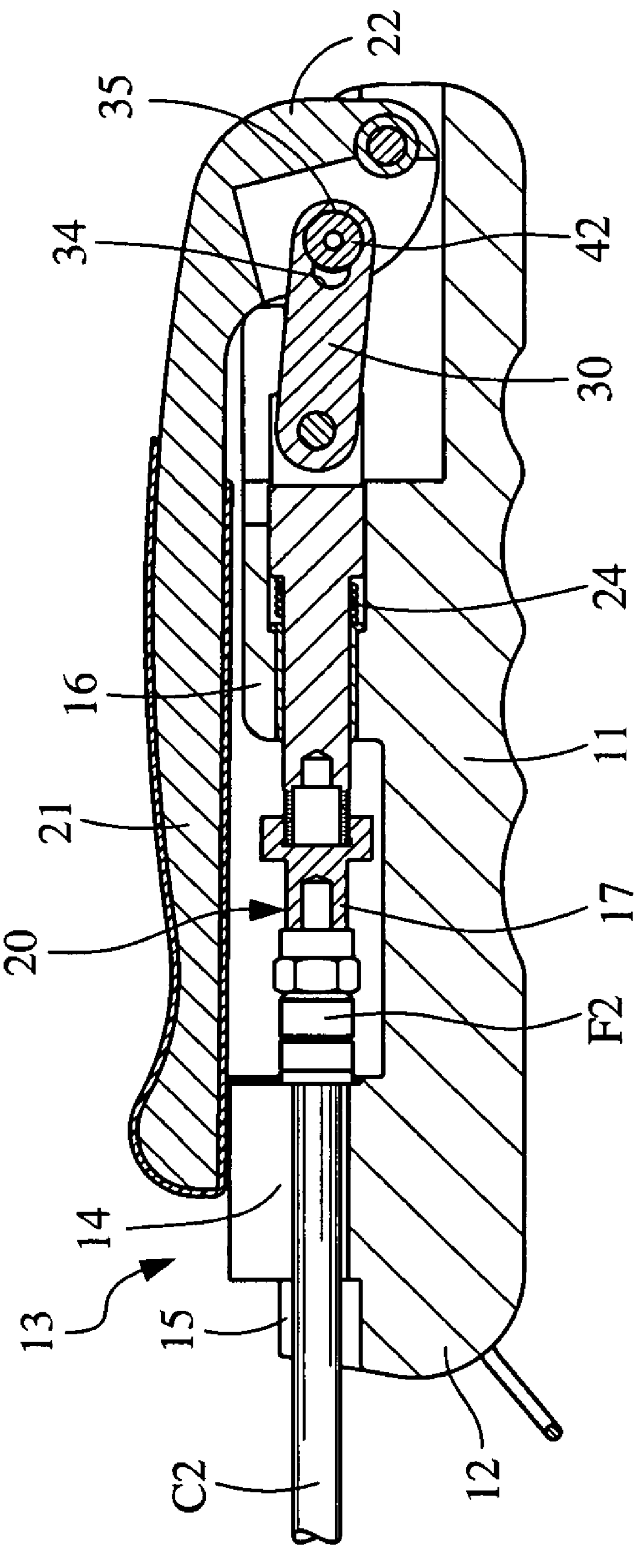
FIG. 9 is a longitudinal sectional view showing the slider of the compression tool shown in FIG. 8 is moved forward to compress and thereby connect an end connector to an end of a cable.

FIGS. 7 to 9 show the relative position and the relation of the second locating pin portion 42 to the rear locating hole 35 when the handle 21 is pivotally turned away from and toward the tool body 11, respectively. To use the compression tool 10 to compress and thereby connect a relatively shorter end connector F2 to an end of a cable C2, first fit the end connector F2 around the end of the cable C2. Then, the end connector F2 located behind the recess 14 of the die 13 is rearward extended until the end connector F2 is pressed against the center pin 17 at the front end of the slider 20. For example, when the connector F2 is 27 mm in length, which is relatively shorter, the operator has to select the second locating pin portion 42 and extends the same through the rear locating hole 35 for pushing the slider 20 forward by a predetermined longer length. To do this, the operator has to pivotally turn the handle 21 upward by a predetermined angle and pushes the push button 40. At this point, the end member 44 of the push button 40 is stopped by the ball 52 of the stop mechanism 50, forcing the second locating pin portion 42 to stay in the rear locating hole 35, as shown in FIG. 7. When the handle 21 is downward pivotally turned about the pivot shaft 23 from the extended position as shown in FIG. 8 to the closed position as shown in FIG. 9, the second locating pin portion 42 on the forked arm 22 of the downward turned handle 21 forces the inner link 30 forward while the inner link 30 is pivotally turned at the rear locating hole 35 about the second locating pin portion 42, so that the slider 20 connected to the first end of the inner link 30 is pushed forward toward the die 13 until the end connector F2 is radially compressed and deformed to tightly crimp onto the end of the cable C2. At this point, the tension spring 24 is in a compressed state. Then, the handle 21 is pivotally turned upward by a large angle, and a restoring force of the tension spring 24 automatically pushes the slider 20 rearward, so that the slider 20 retracts to a home position as that shown in FIG. 8.

In brief, in the present invention, the push button 40 includes two coaxial locating pin portions, namely, the first and the second locating pin portion 41, 42, which are different in the outer diameter; meanwhile, the inner link 30 is provided near a second end 33 thereof with the front locating hole 34 that allows only the first locating pin portion 41 to extend therethrough and the rear locating hole 35 that allows the second locating pin portion 42 to extend therethrough. By switching the push button 40 between the front and the rear locating hole 34, 35, the slider 20 can be easily pushed forward by a shorter or a longer length and is therefore adapted to compress end connectors F1, F2 of different lengths.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A compression tool with adjustable pushing length for connecting an end connector to an end of a cable, comprising:

a die internally defining a recess, and the recess having an inner diameter substantially equal to an outer diameter of the cable for supporting the cable therein;

a slider being axially spaced from the recess for supporting the end connector thereon while the end of the cable to be connected with the end connector being extended through the recess to partially insert in the end connector;

a chamber having the slider slidably mounted thereto, such that the slider is axially movable toward and away from the die;

an inner link being connected at a first end to a rear end of the slider, and being axially spaced from the recess of the die; the inner link being provided near a second end with a front locating hole and a rear locating hole, and the front and the rear locating hole being different in diameter; and a push button being installed on the compression tool for selectively extending through the front locating hole or the rear locating hole to force the inner link forward, so that the slider connected to the first end of the inner link can be axially pushed forward toward the die by two different lengths under control to thereby radially compress and connect the end connector to the end of the cable.

2. The compression tool with adjustable pushing length as claimed in claim 1, wherein the push button includes a first locating pin portion and a second locating pin portion, and the push button being selectively operable for the first locating pin portion to extend through the front locating hole or for the second locating pin portion to extend through the rear locating hole.

3. The compression tool with adjustable pushing length as claimed in claim 2, further comprising a member pivotally turnably assembled to the chamber for moving the push button forward.

4. The compression tool with adjustable pushing length as claimed in claim 3, wherein the pivotally turnable member is provided at a predetermined position with a stop mechanism, the stop mechanism including a sleeve fastened to the pivotally turnable member and having a bottom opening, a ball disposed in the sleeve, and a spring disposed in the sleeve to normally push the ball toward the bottom opening, such that the ball can elastically protrude from the bottom opening or retract into the sleeve; wherein when the push button is pushed inward, the ball elastically presses against the push button to hold the second locating pin portion in the rear locating hole.

5. The compression tool with adjustable pushing length as claimed in claim 3, wherein the pivotally turnable member is a handle assembled to the chamber via a pivot shaft, and the inner link being connected at a second end to the handle via the push button.

6. The compression tool with adjustable pushing length as claimed in claim 1, wherein the slider has a spring mounted therearound to normally axially push the slider away from the die.

* * * * *